(12) United States Patent
Ebihara

(10) Patent No.: US 10,604,223 B2
(45) Date of Patent: Mar. 31, 2020

(54) REDUCTION REVERSE GEAR AND SHIP INCLUDING THE SAME

(71) Applicant: Kanzaki Kokyukoki Mfg. Co., Ltd., Amagasaki-shi, Hyogo (JP)

(72) Inventor: Tomoyuki Ebihara, Amagasaki (JP)

(73) Assignee: KANZAKI KOKYUKOKI MANUFACTURING CO., LTD., Amagasaki, Hyogo (JP)

( * ) Notice: Subject to any disclaimer, the term of this patent is extended or adjusted under 35 U.S.C. 154(b) by 388 days.

(21) Appl. No.: 15/478,837

(22) Filed: Apr. 4, 2017

(65) Prior Publication Data

US 2017/0284511 A1    Oct. 5, 2017

(30) Foreign Application Priority Data

| Apr. 5, 2016 | (JP) | ................................. 2016-076137 |
| Jun. 15, 2016 | (JP) | ................................. 2016-119277 |
| Jun. 15, 2016 | (JP) | ................................. 2016-119278 |

(51) Int. Cl.
  *B63H 23/30* (2006.01)
  *B63H 23/08* (2006.01)
  *F16H 3/60* (2006.01)
  *B63H 23/02* (2006.01)

(52) U.S. Cl.
  CPC ............. *B63H 23/30* (2013.01); *B63H 23/08* (2013.01); *B63H 2023/0283* (2013.01); *F16H 3/60* (2013.01)

(58) Field of Classification Search
  None
  See application file for complete search history.

(56) References Cited

U.S. PATENT DOCUMENTS

| 1,548,917 | A | * | 8/1925 | Vincent | .................... | F16H 3/60 |
| | | | | | | 440/75 |
| 2,581,224 | A | * | 1/1952 | Wallace | ................ | B63H 23/08 |
| | | | | | | 475/159 |
| 3,350,958 | A | * | 11/1967 | Casale | ................... | B63H 23/08 |
| | | | | | | 440/75 |
| 3,478,622 | A | * | 11/1969 | Reid | ..................... | B63H 23/08 |
| | | | | | | 475/298 |

(Continued)

FOREIGN PATENT DOCUMENTS

| JP | 06-078637 U | 11/1994 |
| JP | 07-017486 A | 1/1995 |

*Primary Examiner* — Colby M Hansen
(74) *Attorney, Agent, or Firm* — Cantor Colburn LLP

(57) ABSTRACT

A reduction reverse gear according to the invention of the present application includes: an input shaft to which rotational driving force from a main engine is input; a front-reverse housing accommodating forward-backward switching mechanisms with which the rotational driving force from the input shaft is switched among forward, neutral, and backward; an output shaft through which the rotational driving force from the forward-backward switching mechanisms is output; and a reduction housing accommodating a reduction mechanism with which the rotational driving force from the output shaft is reduced to be transmitted to a propeller shaft. The housings are detachably coupled to each other on front and rear sides in an axial direction. The input shaft and the output shaft are arranged on the same plane while facing each other.

5 Claims, 12 Drawing Sheets

(56) References Cited

U.S. PATENT DOCUMENTS

| | | | | |
|---|---|---|---|---|
| 3,636,909 | A * | 1/1972 | Benson, Jr. | B60K 17/00 |
| | | | | 440/75 |
| 3,803,934 | A * | 4/1974 | Yokel | B63H 23/08 |
| | | | | 74/361 |
| 4,188,833 | A * | 2/1980 | Krauss | B63H 23/02 |
| | | | | 74/404 |
| 4,531,429 | A * | 7/1985 | Shutt | F16H 3/54 |
| | | | | 475/295 |
| 9,102,227 | B2 * | 8/2015 | Yang | B60K 6/547 |
| 2011/0177904 | A1 * | 7/2011 | Kirschner | B63H 5/125 |
| | | | | 475/149 |
| 2018/0079478 | A1 * | 3/2018 | Ebihara | F16H 3/14 |
| 2018/0086428 | A1 * | 3/2018 | Ebihara | B63H 23/08 |

* cited by examiner

REDUCTION REVERSE GEAR AND SHIP INCLUDING THE SAME

CROSS-REFERENCE TO RELATED APPLICATIONS

The present application claims priority to Japanese Patent Application No. 2016-076137 filed Apr. 5, 2016, Japanese Patent Application Nos. 2016-119277 and 2016-119278 both filed on Jun. 15, 2016 and all incorporated herein by reference in their entireties.

BACKGROUND OF THE INVENTION

Field of the Invention

The present invention relates to a reduction reverse gear through which rotational driving force from a main engine is transmitted to a propeller, and to a ship including the reduction reverse gear.

Description of the Related Art

A conventional reduction reverse gear (marine gear unit) for ships, such as ski boats and pleasure boats, includes: a forward clutch and a reverse clutch with which rotational driving force from an engine can be switched among normal rotation, neutral, and reverse rotation; and a reduction gear mechanism with which rotational driving force from the forward or the reverse clutch is reduced and then transmitted to a propeller shaft (see, for example, Japanese Patent Application Laid-Open No. H7-17486).

A conventional reduction reverse gear has a housing incorporating the forward and the reverse clutches and the reduction gear mechanism that are arranged in upper and lower directions, and thus has a long height to be difficult to install in a ship with a limited height.

In recent years, a platform (a base portion in the design) of the reduction reverse gear has been required to be commonly usable in a broadest possible range of models, so that a manufacturing process of the reduction reverse gear can be simplified to facilitate an attempt to achieve a cost reduction and efficient use of resources. However, the size of the reduction reverse gear generally differs among models and specifications in accordance with its engine and work performance, for example. The conventional designs have overlooked aspects such as common use of parts and easier specification changes, and have room for improvement in terms of the recent requirements for a cost reduction and efficient use of resources.

SUMMARY OF THE INVENTION

A technical object of the invention of the present application is to provide an improved reduction reverse gear with which the aforementioned problems are addressed and to provide a ship including the reduction reverse gear.

According to the invention of the present application, a reduction reverse gear includes: an input shaft to which rotational driving force from a main engine is input; a front-reverse housing accommodating a forward-backward switching mechanism with which the rotational driving force from the input shaft is switched among forward, neutral, and backward; an output shaft through which the rotational driving force from the forward-backward switching mechanism is output; and a reduction housing accommodating a reduction mechanism with which the rotational driving force from the output shaft is reduced to be transmitted to a propeller shaft. The housings are detachably coupled to each other on front and rear sides in an axial direction. The input shaft and the output shaft are arranged on a same plane while facing each other.

In the invention of the present application, the input shaft and the output shaft may be coaxially arranged; a forward clutch may be disposed on an outer circumference side of the output shaft; a reverse brake may be arranged on an outer circumference side of the forward clutch; and a planetary gear reverse mechanism may be disposed on a portion of the output shaft more on a downstream side than the forward clutch and the reverse brake.

In the invention of the present application, the forward clutch and the reverse clutch may be respectively disposed on one and another of a left or right side of the input shaft.

In the invention of the present application, the front-reverse housing and the reduction housing may be detachably coupled to each other on the front and rear sides in the axial direction of the output shaft; and the reduction mechanism may form a conical gear mechanism obtained by coupling a plurality of conical gears at a same inclined angle, or by coupling a plurality of conical gears at different inclined angles.

In the invention of the present application, an idle shaft may be rotatably supported between the output shaft and the propeller shaft in the reduction housing; rotational driving force may be transmitted to a reduction output gear disposed on the propeller shaft from a reduction drive gear disposed on the output shaft via an idle gear disposed on the idle shaft; and a combination of the reduction drive gear, the idle gear, and the reduction output gear may form the conical gear mechanism.

The invention of the present application also includes a ship including a ship body in which any of the above-described reduction reverse gears is installed.

DETAILED DESCRIPTION OF THE PREFERRED EMBODIMENTS

The following describes embodiments of the invention according to the present application with reference to the accompanying drawings (FIG. 1 to FIG. 10). In the following description, terms that refer to specific directions or positions as necessary (e.g., "left and right" and "upper and lower") are based on a front side indicating a bow side and a rear side indicating a stern side of a ski boat 1, which is a ship. These terms are used for convenience of description and are not intended to limit the technical scope of the invention according to the present application.

Figure 1:
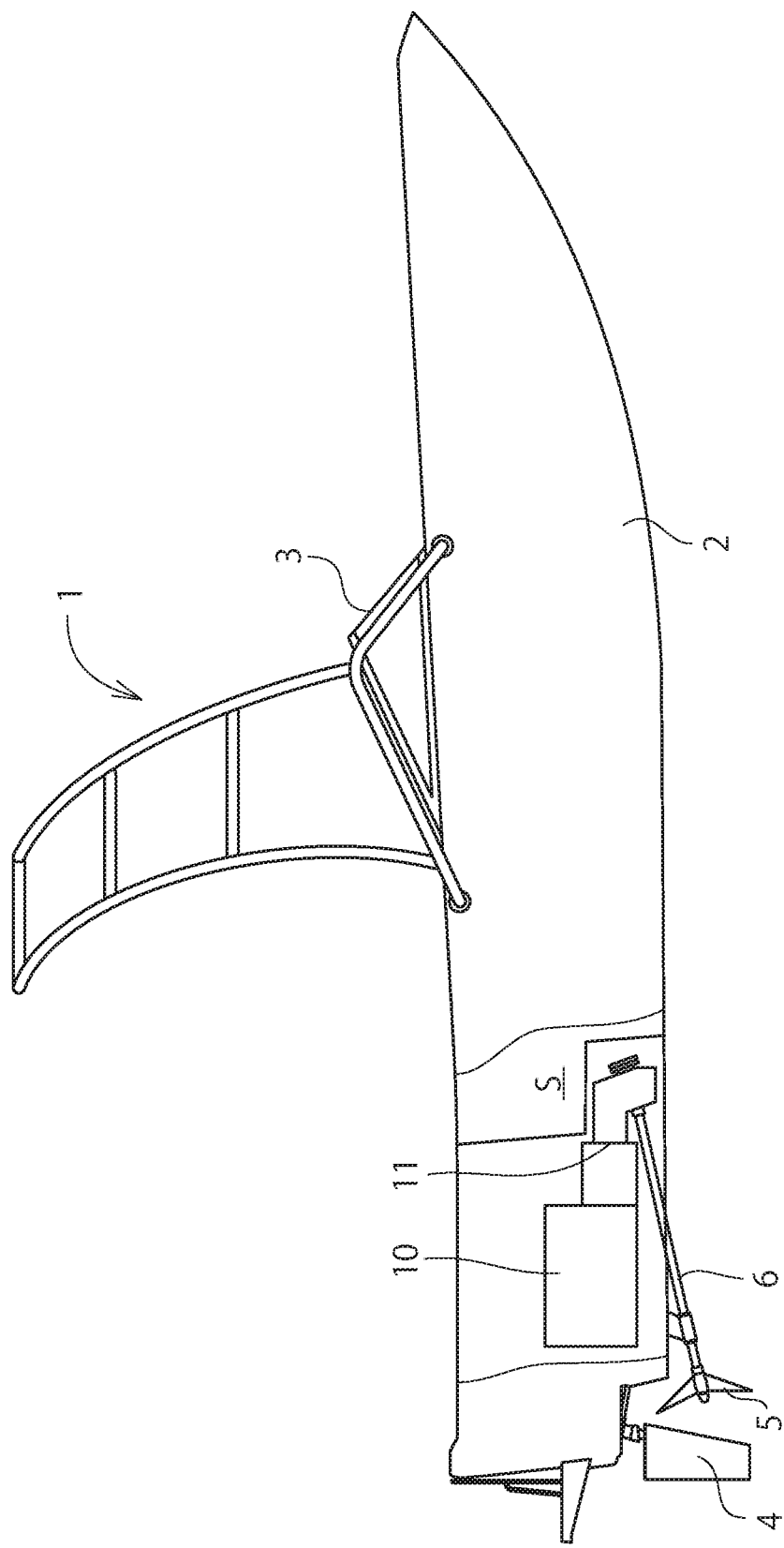
FIG. 1 is a schematic side view of a ski boat.

As illustrated in FIG. 1, the ski boat 1, which is a ship, includes: a ship body 2; an operation section 3 disposed on a center side on an upper surface of the ship body; a rudder 4 provided on a bottom rear end side of the ship body 2; and a propeller 5 disposed on the bottom rear end side of the ship body 2 and on a forward side of the rudder 4. A propeller shaft 6 that rotates the propeller 5 is rotatably supported on the bottom rear end side of the ship body 2. The propeller 5 is attached on a protruding end side of the propeller shaft 6.

Although not elaborated in the figure, the operation section 3 includes: a steering wheel that is operated for changing the cruising direction of the ship body 2 between leftward and rightward; a forward-reverse lever serving as a forward-reverse operation tool operated to switch the cruising direction of the ship body 2 between forward and backward; a trolling lever serving as a super-slow cruising operation tool for achieving super-slow cruising of the ship body 2; and a throttle lever serving as a speed operation tool for setting and maintaining an output rotation speed of an engine 10 described later. The operation tools are not limited to levers, and may be in other forms such as a dial.

The ship body 2 has an inner bottom portion in a stern side including: the engine 10 serving as a main engine, which is a driving source for the propeller 5; and a reduction reverse gear 11 through which the rotational driving force from the engine 10 is transmitted to the propeller 5. The propeller 5 is drivingly rotated by the rotational driving force transmitted from the engine 10 to the propeller shaft 6 via the reduction reverse gear 11. The reduction reverse gear 11 according to this embodiment employs what is called a V-drive system with the propeller shaft 6 defining a sharp shaft angle in side view (a sharp angle is formed between an input shaft 13 (or an output shaft 16) and the propeller shaft 6 in side view). The reduction reverse gear 11 is disposed on a forward side of the engine 10.

Figure 2:
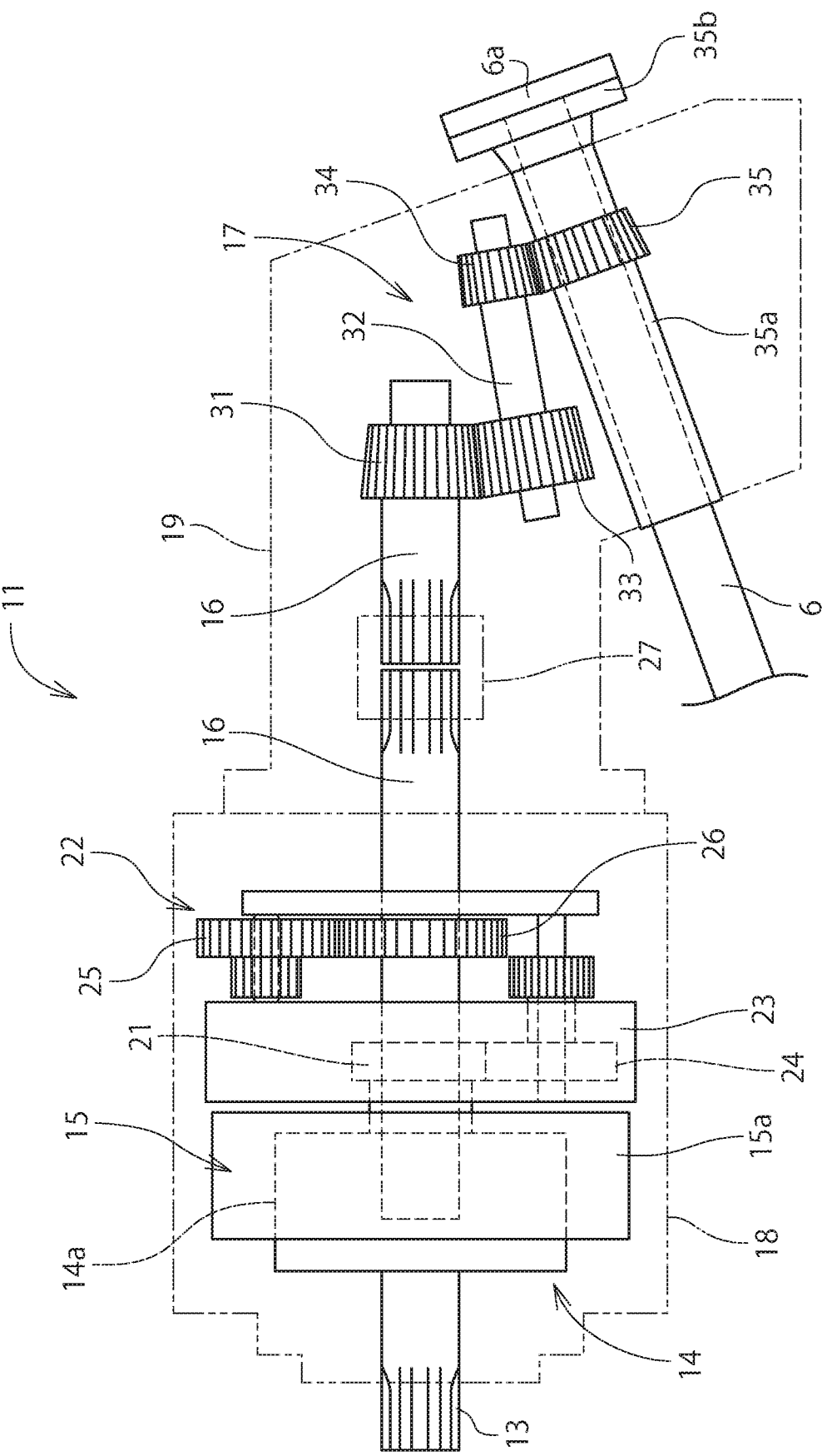
FIG. 2 is a side view of a reduction reverse gear according to a first embodiment.
Figure 3:
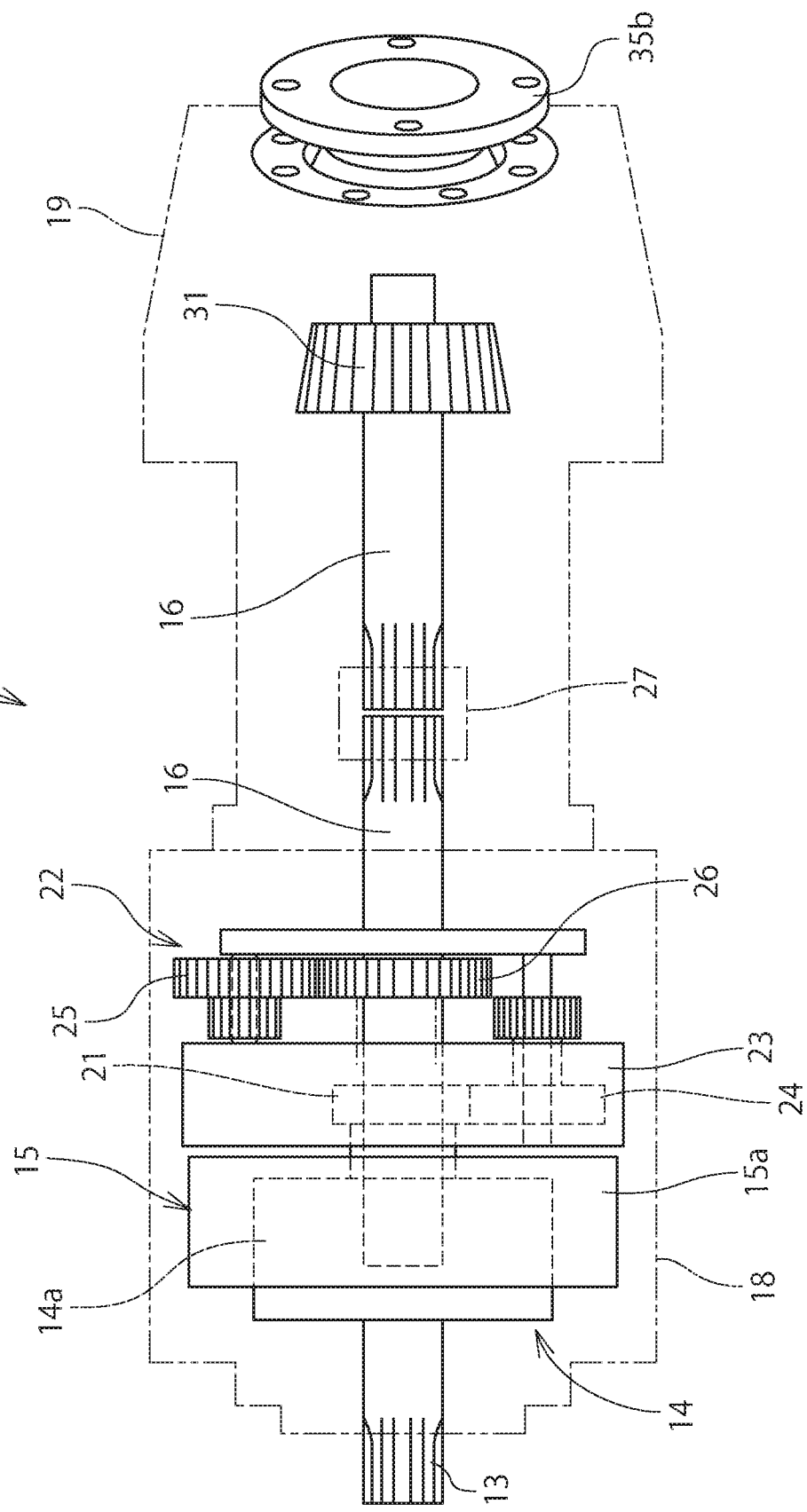
FIG. 3 is a plan view of the reduction reverse gear.
Figure 4:
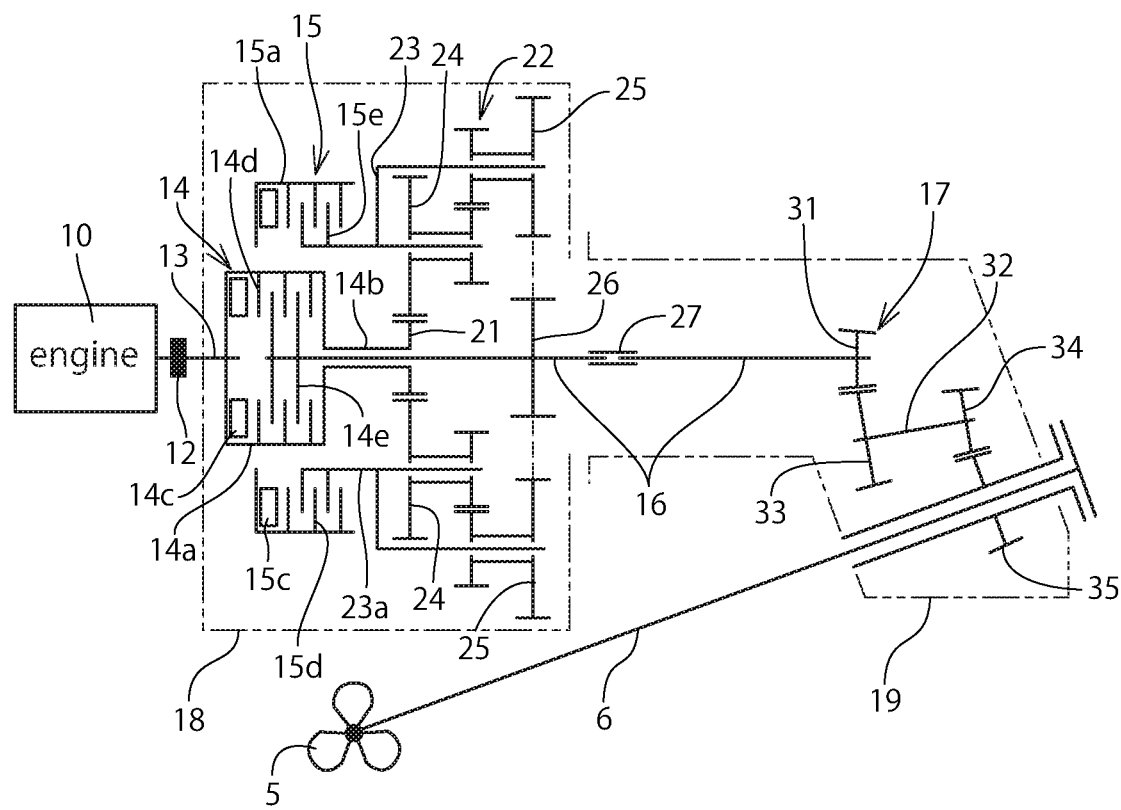
FIG. 4 is a skeleton view of a power transmission system.

FIG. 2 to FIG. 4 illustrate a first embodiment of the reduction reverse gear 11. As illustrated in FIG. 2 to FIG. 4, the reduction reverse gear 11 according to the first embodiment includes: the input shaft 13 coupled to a flywheel 12 of the engine 10; a forward clutch 14 and a reverse brake 15 serving as a forward-backward switching mechanism that switches the rotational driving force from the input shaft 13 among forward, neutral, and backward; an output shaft 16 through which the rotational driving force from the forward clutch 14 or the reverse brake 15 is output; and a conical gear mechanism 17 serving as a reduction mechanism with which the rotational driving force from the output shaft 16 is reduced to be transmitted to the propeller shaft 6.

The reduction reverse gear 11 has an outer casing including: a front-reverse housing 18 having a hollow box shape; and a reduction housing 19 having a hollow structure and an L shape in side view. The housings 18 and 19 with a lower height of the upper surfaces can ensure a larger passenger space S in the ship. The reduction housing 19 has a straight portion rear surface side detachably coupled to the front surface side of the front-reverse housing 18 with a plurality of bolts. The front-reverse housing 18 accommodates: the input shaft 13; an upstream side of the output shaft 16; the forward clutch 14 and the reverse brake 15; and the like. The reduction housing 19 accommodates a downstream side of the output shaft 16; the conical gear mechanism 17; and the upstream side of the propeller shaft 6. The input shaft 13 protrudes rearward from the rear surface side of the front-reverse housing 18. The propeller shaft 6 protrudes diagonally rear and downward from a rear surface side of a downward extending portion of the reduction housing 19, to protrude from the bottom.

The input shaft 13 and the output shaft 16 are coaxially arranged. The forward clutch 14 is disposed on an outer circumference side of the output shaft 16, and the reverse brake 15 is disposed on an outer circumference side of the forward clutch 14. The forward clutch 14 and the reverse brake 15 are a multiple wet hydraulic friction clutch or brake.

The forward clutch 14 is on the upstream side of the output shaft 16 coaxially extending with the input shaft 13, and has a structure in which steel plates 14d and friction plates 14e are alternately arranged. The forward clutch 14 includes: a forward casing 14a with the steel plates 14d; a forward cylinder 14b fixed to the forward casing 14a; and a forward clutch cylinder 14c that generates pressure contact force (clutch pressure) with hydraulic pressure. The forward casing 14a is fixed to the input shaft 13. The output shaft 16 has the rear end side inserted to an inner circumference side of the forward casing 14a. The rear end side of the output shaft 16 is rotatably supported by the inner circumference side of the forward casing 14a. The friction plates 14e that can be in pressure contact with the steel plates 14d are provided on an outer circumference portion of the rear end side of the output shaft 16. The forward cylinder 14b is rotatably fit on the output shaft 16. A reverse driving gear 21 is integrally formed with an outer circumference portion of a front end side of the forward cylinder 14b.

The reverse brake 15 is disposed on an outer circumference side of the forward clutch 14 in such a manner as to overlap with the forward clutch 14, and has a structure, similar to that of the forward clutch 14, in which steel plates 15d and friction plates 15e are alternately arranged. The reverse brake 15 includes: a reverse casing 15a with the steel plates 15d; and a reverse brake cylinder 15c that generates pressure contact force with hydraulic pressure. The reverse casing 15a is fixed in the front-reverse housing 18. The forward casing 14a is positioned on an inner circumference side of the reverse casing 15a. The friction plates 15e that can be in pressure contact with the steel plates 15d are provided in an outer circumference portion of a rearward annular protrusion 23a formed on a carrier 23 described later. The carrier 23 is rotatably fit on the forward cylinder 14b.

A portion of the output shaft 16, more on the downstream side (on the front side in the rear portion) than the forward clutch 14 and the reverse brake 15, is provided with a planetary gear reverse mechanism 22. The planetary gear reverse mechanism 22 includes the carrier 23 on which a plurality of sets of a planetary gear 24 and a reverse gear 25 are rotatably supported. As described above, the carrier 23 is rotatably fit on the forward cylinder 14b. The group of planetary gears 24 are positioned to be at the same radius on the front surface side of the carrier 23, whereas the group of reverse gears 25 are positioned to be at the same radius, different from that of the group of planetary gears 24, on the front surface side of the carrier 23. The planetary gears 24 of the carrier 23 are constantly in mesh with the reverse driving gear 21 of the forward cylinder 14b from the radially outer side. The planetary gears 24 are each constantly in mesh with a corresponding one of the reverse gears 25. The reverse gears 25 are constantly in mesh with a reverse driven gear 26 fixed to a front side portion in the rear portion of the output shaft 16.

As illustrated in FIG. 2 to FIG. 4, the output shaft 16 can be divided into front and rear portions in the axial direction. Thus, the output shaft 16 is divided into two portions that are on the upstream side and the downstream side. A front end portion of the upstream side output shaft 16 and a rear end portion of the downstream side output shaft 16 are coupled to each other via a coupling 27 in such a manner as to be slidable in the axial direction but not rotatable with respect to each other (spline fitting). Thus, the output shafts 16 are separated into a side of the front-reverse housing 18 and a side of the reduction housing 19, when the front-reverse housing 18 and the reduction housing 19 are separated from each other with the plurality of bolts removed. Thus, the front-reverse housing 18 and the reduction housing 19 can be easily separated from each other without changing the mechanisms in the front-reverse housing 18 and in the reduction housing 19.

An idle shaft 32 is rotatably supported between the front end side of the output shaft 16 and the front end side of the propeller shaft 6 in the reduction housing 19. A first idle gear 33 and a second idle gear 34 are fixed to the idle shaft 32. A reduction drive gear 31 is fixed to the front end side of the output shaft 16 (the front end side of the downstream side output shaft 16). A reduction output gear 35 is fixed to the front end side (upstream side) of the propeller shaft 6. The reduction drive gear 31 of the output shaft 16 is constantly in mesh with the first idle gear 33 of the idle shaft 32. The second idle gear 34 of the idle shaft 32 is constantly in mesh with the reduction output gear 35 of the propeller shaft 6.

The reduction drive gear 31, the pair of idle gears 33 and 34, and the reduction output gear 35 are each a conical gear formed to have a conical shape with teeth continuously inclined with respect to the axial direction, and form the conical gear mechanism 17 serving as a reduction mechanism with a fixed reduction ratio. The rotational driving force from the output shaft 16 is reduced at the fixed reduction ratio through the reduction drive gear 31, the pair of idle gears 33 and 34, and the reduction output gear 35. The conical gear mechanism 17 serving as the reduction mechanism is advantageous in that the shaft angle defined by the propeller shaft 6 in side view can be easily set to be various large and small angles with a combination of a plurality of conical gears. For example, a large shaft angle of the propeller shaft 6 and the like can be easily achieved in the ski boat 1. The conical gear mechanism 17 may be obtained by coupling a plurality of conical gears at the same inclined angle, or by coupling a plurality of conical gears at different inclined angles.

The supply destination of the hydraulic oil is switched among the forward clutch 14 (forward clutch cylinder 14c), the reverse brake 15 (reverse brake cylinder 15c), or neutral in accordance with an operation to move the forward-reverse lever in the operation section 3 among forward, reverse, and neutral.

When the forward-reverse lever is operated for the forward movement to achieve a power connection state of the forward clutch 14 (when the steel plates 14d of the forward casing 14a and the friction plates 14e of the output shaft 16 are brought into pressure contact with each other with hydraulic pressure), the reverse brake 15 is in a power disconnection state, whereby the forward clutch 14 causes the input shaft 13 to integrally rotate with the output shaft 16. Thus, the rotational driving force from the engine 10 is transmitted to the output shaft 16 from the input shaft 13 via the forward clutch 14, and is then transmitted to the propeller shaft 6 from the output shaft 16 via the conical gear mechanism 17. As a result, the forward cruising state of the ship 1 is achieved in which the rotational driving force from the engine 10 is transmitted as a forward direction output to the propeller shaft 6. A forward cruising speed of the ship 1 in a normal cruising state is adjusted with a throttle lever in the operation section 3. When the forward clutch 14 is in the power connection state, the reverse driving gear 21 and the reverse driven gear 26 rotate in the same direction and at the same speed. Thus, the carrier 23 and the output shaft 16 rotate in the same direction and at the same speed, with no rotation of the group of planetary gears 24 or the group of reverse gears 25.

When the forward-reverse lever is operated for the backward movement to achieve a power connection state of the reverse brake 15, the forward clutch 14 is in the power disconnection state and the carrier 23 is fixed to the reverse casing 15a. Thus, the rotational driving force from the engine 10 is transmitted to the planetary gears 24 of the carrier 23 from the input shaft 13 via the reverse driving gear 21 of the forward cylinder 14b, and then is transmitted to the reverse driven gear 26 of the output shaft 16 from the planetary gears 24 via the reverse gears 25. Thus, the output shaft 16 rotates in the direction opposite to that of the input shaft 13, whereby the rotational driving force in the reverse direction is transmitted from the output shaft 16 to the propeller shaft 6 via the conical gear mechanism 17. As a result, the ship 1 transitions to the backward cruising state, in which the rotational driving force from the engine 10 is transmitted as a backward direction output to the propeller shaft 6. A backward cruising speed of the ship 1 in the normal cruising state is also adjusted with the throttle lever.

When the forward-reverse lever is operated to be at the neutral so that both the forward clutch 14 and the reverse brake 15 are in the power disconnection state, a neutral state is achieved in which the rotational driving force of the engine 10 is not transmitted to the output shaft 16 or the propeller shaft 6.

As described above and illustrated in FIG. 2 to FIG. 4, the reduction reverse gear 11 includes: the input shaft 13 to which the rotational driving force from the main engine 10 is input; the forward-backward switching mechanisms 14 and 15 with which the rotational driving force from the input shaft 13 is switched among forward, neutral, and backward; the output shaft 16 through which the rotational driving force from the forward-backward switching mechanisms 14 and 15 is output; and the reduction mechanism 17 with which the rotational driving force from the output shaft 16 is reduced to be transmitted to the propeller shaft 6. The front-reverse housing 18 accommodating the forward-backward switching mechanisms 14 and 15 and the reduction housing 19 accommodating the reduction mechanism 17 are detachably coupled to each other on the front and rear sides in the axial direction. Thus, a platform of the reduction reverse gear 11 commonly usable by different models can be designed with the front-reverse housing 18 being commonly usable and the reduction housing 19 having the V-drive system, an angle drive system, or a parallel shaft system. Thus, the front-reverse housing 18 can be commonly used among different models and specifications, and the reduction reverse gear 11 can be easily applied to a plurality of models and specifications of the ship 1, simply by changing the specification of the reduction housing 19. All things considered, the reduction reverse gear 11 needs not to be manufactured differently for different models and for different specifications, whereby a manufacturing cost can be reduced for a certain group of models and specifications as a whole.

The input shaft 13 and the output shaft 16 are arranged on the same plane while facing each other, whereby the housings 18 and 19, accommodating the input shaft 13, the forward-backward switching mechanisms 14 and 15, and the output shaft 16, with a lower height can be achieved in the reduction reverse gear 11, whereby a compact reduction reverse gear 11 can be achieved. Thus, the reduction reverse gear 11 with a higher versatility can be achieved that can be installed in the ship 1 with a limited height.

The input shaft 13 and the output shaft 16 are coaxially arranged, the forward clutch 14 is disposed on the outer circumference side of the output shaft 16, the reverse brake 15 is arranged on the outer circumference side of the forward clutch 14, and the planetary gear reverse mechanism 22 is disposed on the portion of the output shaft 16 more on the downstream side than the forward clutch 14 and the reverse brake 15. Furthermore, the housings 18 and 19, accommodating the input shaft 13, the forward clutch 14, the reverse brake 15, and the output shaft 16, can have a lower height and a shorter length in the axial direction in the reduction reverse gear 11. Thus, an even more compact reduction reverse gear 11 can be achieved.

Figure 5:
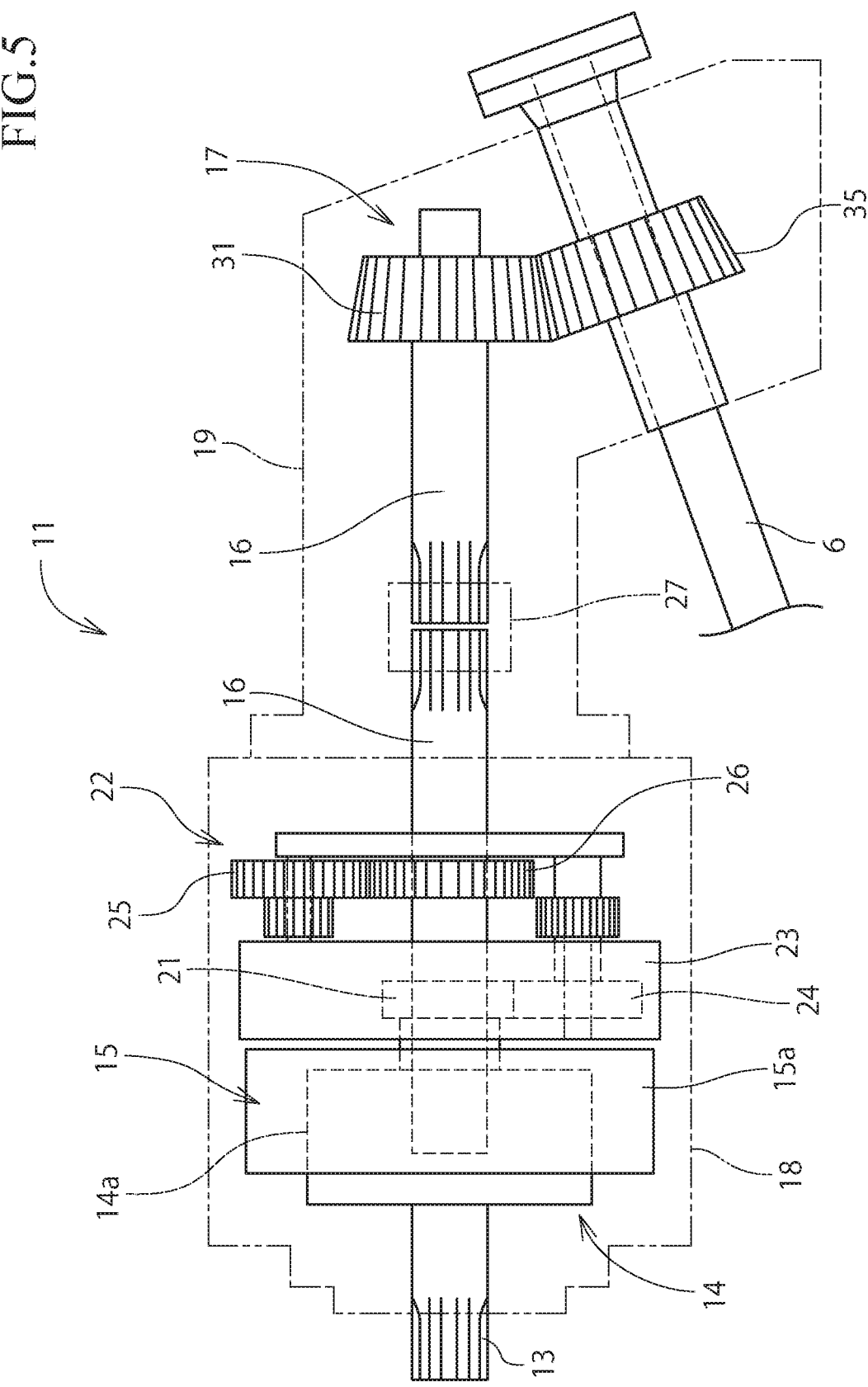
FIG. 5 is a side view illustrating another example of the reduction reverse gear.
Figure 6:
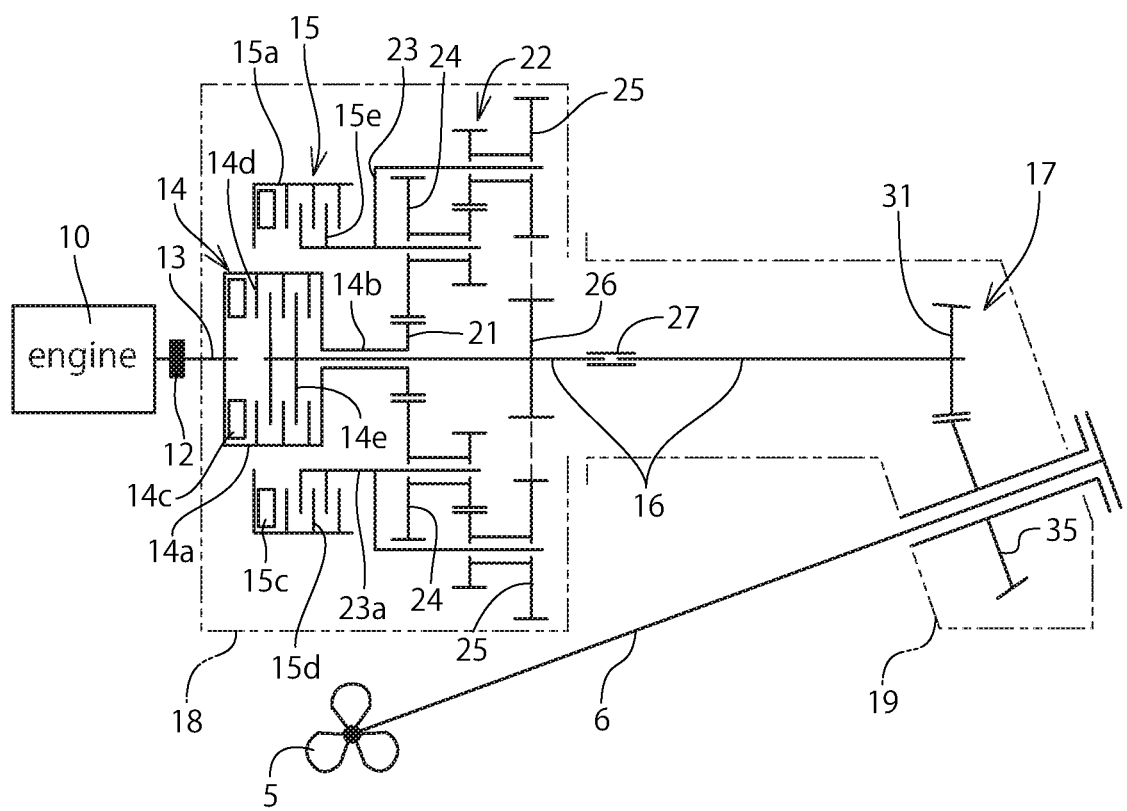
FIG. 6 is a skeleton view of a power transmission system.
Figure 7:
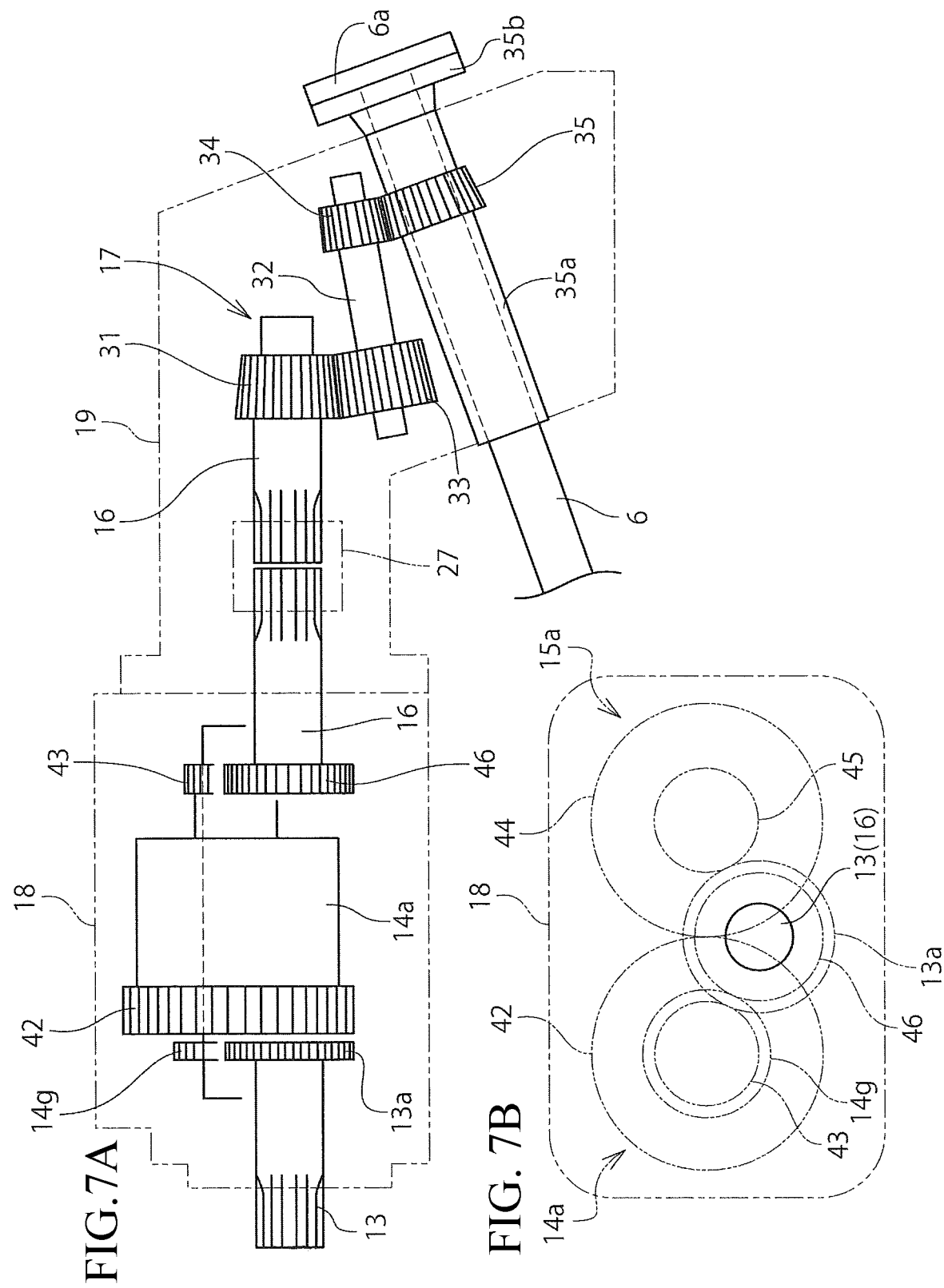
FIG. 7A is a side view of a reduction reverse gear according to a second embodiment.
FIG. 7B is a schematic front view illustrating how gears are meshed.

FIG. 5 and FIG. 6 illustrate another example (modification) of the reduction reverse gear 11 according to the first embodiment. As illustrated in FIG. 5 and FIG. 6, when the reduction drive gear 31 and the reduction output gear 35 can have a conical shape of a relatively large angle, the reduction drive gear 31 and the reduction output gear 35 may be directly meshed with each other with the idle shaft 32 and the pair of the idle gears 33 and 34 omitted.

Next, a second embodiment of the reduction reverse gear 11 is described with reference to FIG. 7A and FIG. 7B to FIG. 9. The second embodiment differs from the first embodiment in that the forward clutch 14 and the reverse clutch 15 are arranged side by side with the planetary gear reverse mechanism 22 omitted. In the second embodiment, an input relay gear 14g, fixed to a rear end side of a forward clutch shaft 14f extending in parallel with the input shaft 13, is constantly in mesh with an input gear 13a fixed to the front end side of the input shaft 13. The forward clutch 14 is on the forward clutch shaft 14f, and has a structure in which the steel plates 14d and the friction plates 14e are alternately arranged. The forward clutch 14 includes: the forward casing 14a with the steel plates 14d; the forward cylinder 14b with the friction plates 14e that can be in pressure contact with the steel plates 14d; and the forward clutch cylinder 14c that generates pressure contact force with hydraulic pressure. The forward casing 14a is fixed to the forward clutch shaft 14f. The forward cylinder 14b is rotatably fit on the forward clutch shaft 14f. The forward cylinder 14b has a rear end side inserted to an inner circumference side of the forward casing 14a. A forward gear 42 is integrally formed on the outer circumference side of the forward casing 14a. A forward reduction gear 43 is integrally formed on the front end side of the forward cylinder 14b. The forward clutch shaft 14f serves as a supporting shaft for the forward clutch 14.

The reverse clutch 15 is on the reverse clutch shaft 15f, extending in parallel with the input shaft 13, and has a structure, similar to that of the forward clutch 14, in which the steel plates 15d and the friction plates 15e are alternately arranged. The reverse clutch 15 includes: the reverse casing 15a with the steel plates 15d; a reverse cylinder 15b with the friction plates 15e that can be in pressure contact with the steel plates 15d; and the reverse clutch cylinder 15c that generates pressure contact force with hydraulic pressure. The reverse casing 15a is fixed to the reverse clutch shaft 15f. The reverse cylinder 15b is rotatably fit on the reverse clutch shaft 15f. The reverse cylinder 15b has the rear end side inserted to an inner circumference side of the reverse casing 15a. A reverse gear 44 is integrally formed on the outer circumference side of the reverse casing 15a. A reverse reduction gear 45 is integrally formed on the front end side of the reverse cylinder 15b. The reverse gear 44 is constantly in mesh with the forward gear 42 of the forward clutch 14. The forward reduction gear 43 and the reverse reduction gear 45 are constantly in mesh with an output gear 46 fixed to the rear end side of the output shaft 16. The reverse clutch shaft 15f serves as a supporting shaft for the reverse clutch 15. The structure of the output gear 46 and other parts is the same as that in the first embodiment.

Figure 8:
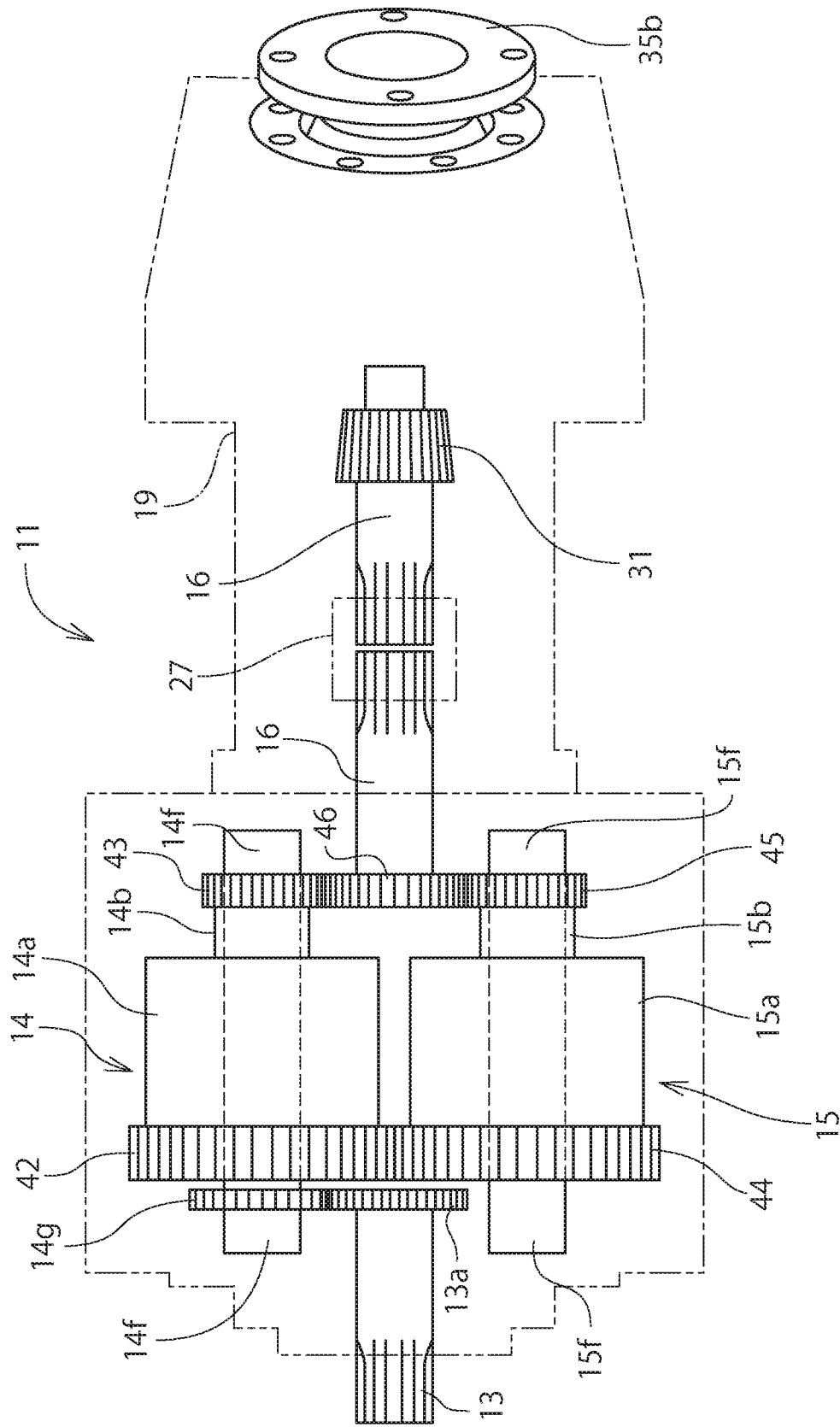
FIG. 8 is a plan view of the reduction reverse gear.
Figure 9:
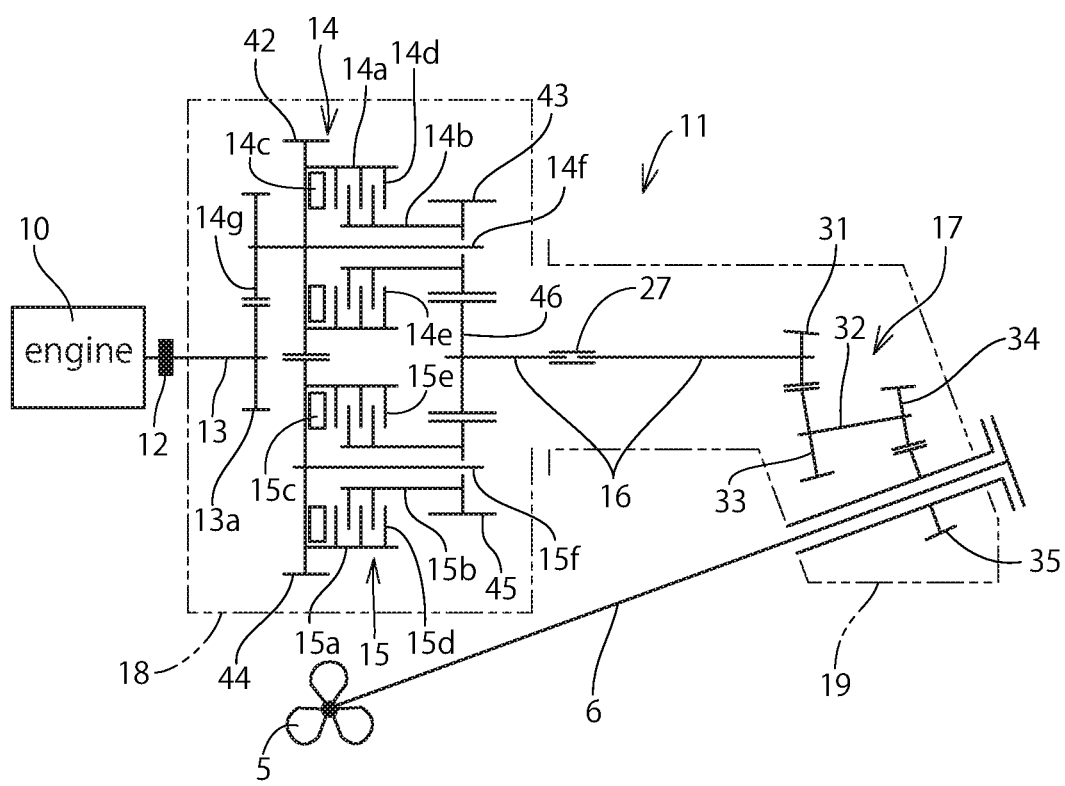
FIG. 9 is a skeleton view of a power transmission system.

As illustrated in FIGS. 7A and 7B and FIG. 8, the forward clutch 14 and the reverse clutch 15 are arranged side by side in the front-reverse housing 18, and the input shaft 13 and the forward clutch shaft 14f, and the reverse clutch shaft 15f and the output shaft 16 are positioned on the same plane. For example, the input shaft 13, the forward clutch shaft 14f, the reverse clutch shaft 15f, and the output shaft 16 appear to be coaxially arranged in side view. In this configuration, the housings 18 and 19, accommodating the input shaft 13, the forward clutch 14 and the reverse clutch 15, and the output shaft 16, with a lower height can be achieved in the reduction reverse gear 11, whereby a compact reduction reverse gear 11 can be achieved (still, the front-reverse housing 18 has a slightly larger width because the forward clutch 14 and the reverse clutch 15 are arranged side by side). Thus, the reduction reverse gear 11 with a higher versatility can be achieved that can be installed in the ship such as the ski boat 1 with a limited height.

Figure 10:
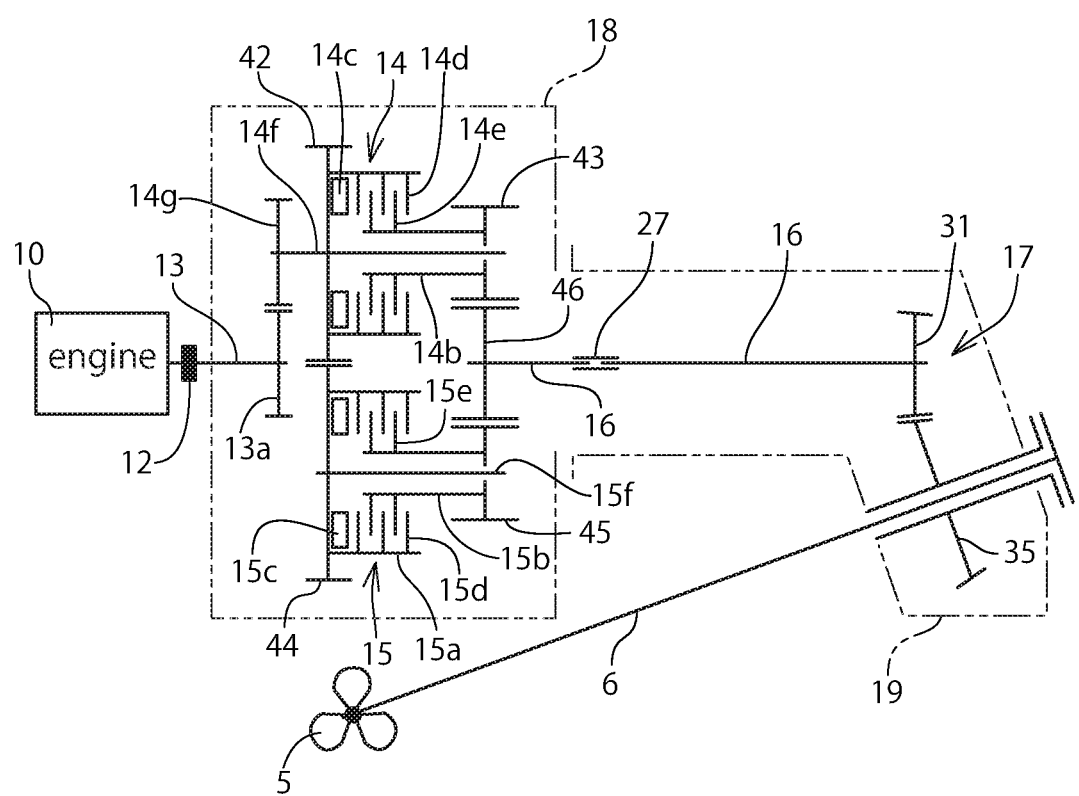
FIG. 10 is a skeleton view of a reduction reverse gear according to another embodiment.

FIG. 10 illustrates another example (modification) of the reduction reverse gear 11 according to the second embodiment. As illustrated in FIG. 10, also in the second embodiment, when the reduction drive gear 31 and the reduction output gear 35 can have a conical shape of a relatively large angle, the reduction drive gear 31 and the reduction output gear 35 may be directly meshed with each other with the idle shaft 32 and the pair of the idle gears 33 and 34 omitted.

Figure 11:
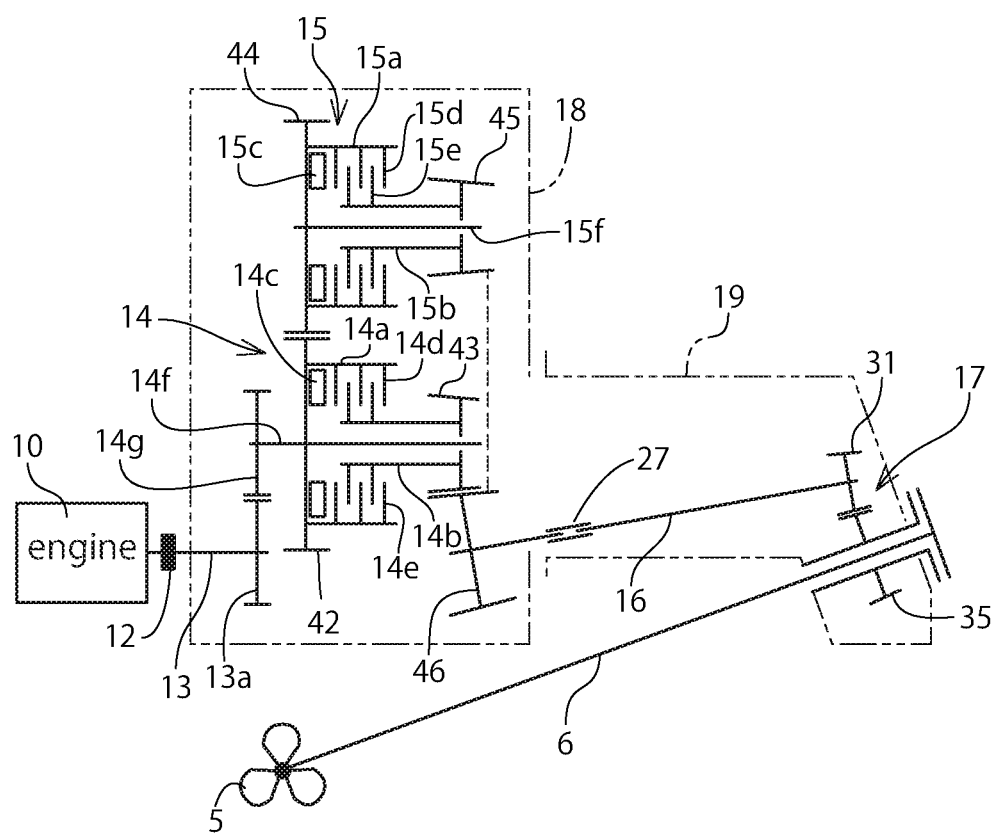
FIG. 11 is a skeleton view of a reduction reverse gear according to a first reference example.
Figure 12:
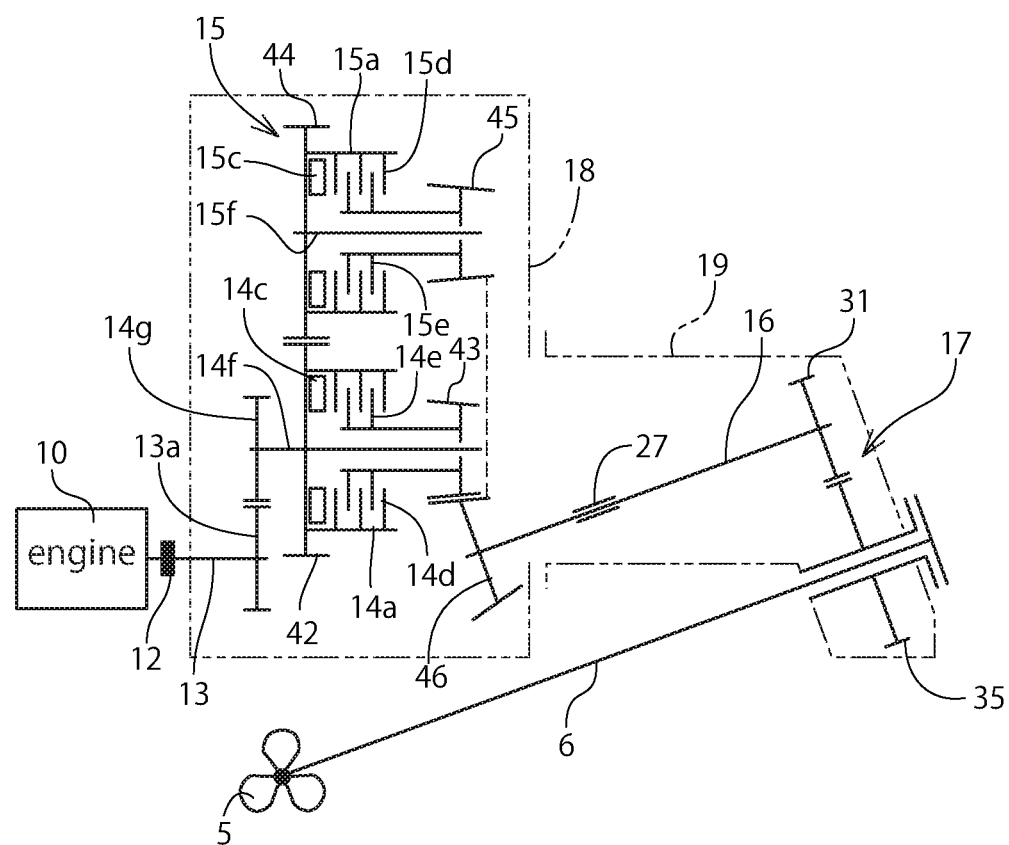
FIG. 12 is a skeleton view of a reduction reverse gear according to a second reference example.

FIG. 11 and FIG. 12 illustrate reference examples of the reduction reverse gear 11 based on the other example of the second embodiment. FIG. 11 illustrates a first reference example in which the forward reduction gear 43, the reverse reduction gear 45, and the output gear 46 are each a conical gear, and the output shaft 16 is inclined. FIG. 12 illustrates a second reference example in which the forward reduction gear 43, the reverse reduction gear 45, and the output gear 46 are each a conical gear, whereas the reduction drive gear 31 and the reduction output gear 35 are each a flat gear, and the output shaft 16 is inclined while extending in parallel with the propeller shaft 6. In these reference examples, the output shaft 16 is not in parallel with the input shaft 13 or the like and is not on the same plane as the input shaft 13 or the like. Still, the effect of reducing the height of the housings 18 and 19 is not compromised as long as the inclination of the output shaft 16 does not overwhelm the size of the reduction housing 19.

The configurations of each unit according to the invention of the present application are not limited to the embodiments illustrated in the accompanying drawings, and can be changed without departing from the spirit of the invention of the present application.

The invention claimed is:

1. A reduction reverse gear comprising:
   an input shaft to which rotational driving force from a main engine is input;

a front-reverse housing accommodating a forward-backward switching mechanism with which the rotational driving force from the input shaft is switched among forward, neutral, and backward;

an output shaft through which the rotational driving force from the forward-backward switching mechanism is output; and a reduction housing accommodating a reduction mechanism with which the rotational driving force from the output shaft is reduced to be transmitted to a propeller shaft;

wherein the front-reverse housing and the reduction housing are detachably coupled to each other on front and rear sides in an axial direction of the output shaft; and the input shaft and the output shaft are arranged on a same plane while facing each other;

the output shaft is dividable into front and rear portions in the axial direction;

the output shaft is separated into a side of the front-reverse housing and a side of the reduction housing, when the front-reverse housing and the reduction housing are separated from each other; and the reduction mechanism forms a conical gear mechanism obtained by coupling a plurality of conical gears at a same inclined angle, or by coupling a plurality of conical gears at different inclined angles.

2. The reduction reverse gear according to claim 1,
wherein the input shaft and the output shaft are coaxially arranged;
a forward clutch is disposed on an outer circumference side of the output shaft;
a reverse brake is arranged on an outer circumference side of the forward clutch; and
a planetary gear reverse mechanism is disposed on a portion of the output shaft more on a downstream side than the forward clutch and the reverse brake.

3. The reduction reverse gear according to claim 1,
wherein a forward clutch and a reverse clutch are respectively disposed a first side of the input shaft and a second side of the input shaft opposite to the first side.

4. The reduction reverse gear according to claim 1,
wherein an idle shaft is rotatably supported between the output shaft and the propeller shaft in the reduction housing;
rotational driving force is transmitted to a reduction output gear disposed on the propeller shaft from a reduction drive gear disposed on the output shaft via an idle gear disposed on the idle shaft; and
the conical gear mechanism is formed of a combination of the reduction drive gear, the idle gear, and the reduction output gear.

5. A ship comprising a ship body in which the reduction reverse gear according to claim 1 is installed.

* * * * *